(12) United States Patent
Chen et al.

(10) Patent No.: US 10,893,300 B2
(45) Date of Patent: Jan. 12, 2021

(54) SYSTEM AND METHOD FOR VIDEO PROCESSING

(71) Applicant: SZ DJI TECHNOLOGY CO., LTD., Shenzhen (CN)

(72) Inventors: Xing Chen, Shenzhen (CN); Zisheng Cao, Shenzhen (CN); Lei Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 134 days.

(21) Appl. No.: 15/824,581

(22) Filed: Nov. 28, 2017

(65) Prior Publication Data

US 2018/0091828 A1 Mar. 29, 2018

Related U.S. Application Data

(63) Continuation of application No. PCT/CN2015/080230, filed on May 29, 2015.

(51) Int. Cl.
*H04N 19/91* (2014.01)
*H04N 19/503* (2014.01)
(Continued)

(52) U.S. Cl.
CPC .......... *H04N 19/91* (2014.11); *H04N 19/105* (2014.11); *H04N 19/13* (2014.11); *H04N 19/503* (2014.11)

(58) Field of Classification Search
CPC ........ H04N 19/61; H04N 19/13; H04N 19/70; H04N 19/172; H04N 19/159; H04N 19/11;
(Continued)

(56) References Cited

U.S. PATENT DOCUMENTS

| 5,329,313 A | 7/1994 | Keith |
| 5,861,922 A * | 1/1999 | Murashita ............ H04N 9/8047 375/240.24 |

(Continued)

FOREIGN PATENT DOCUMENTS

| CN | 1784008 A | 6/2006 |
| CN | 102196271 A | 9/2011 |

(Continued)

OTHER PUBLICATIONS

The World Intellectual Property Organization (WIPO) International Search Report and Written Opinion for PCT/CN2015/080230 Mar. 8, 2016 8 Pages.

(Continued)

*Primary Examiner* — Nathnael Aynalem
(74) *Attorney, Agent, or Firm* — Anova Law Group, PLLC

(57) ABSTRACT

A system for processing a video obtains a prediction table for a reference frame of the video and codes one or more target frames of the video based on the prediction table. The prediction table is a Huffman table of difference values for reference pixels of the reference frame. The difference value for a reference pixel is determined based on an actual value of the reference pixel and a prediction value determined based on respective pixel values of one or more pixels adjacent to the reference pixel. The one or more target frames are coded based on the Huffman table of the reference frame and prediction values of the one or more target frames.

15 Claims, 8 Drawing Sheets

(51) Int. Cl.
*H04N 19/105* (2014.01)
*H04N 19/13* (2014.01)

(58) Field of Classification Search
CPC .. H04N 19/463; H04N 19/102; H04N 19/593;
H04N 19/52; H04N 19/91; H04N 19/103;
H04N 19/50; H04N 19/10; H04N 19/503;
H04N 19/59; H04N 19/62; H04N 19/96
USPC ........................................ 375/240.01–240.29
See application file for complete search history.

(56) References Cited

U.S. PATENT DOCUMENTS

| | | | | |
|---|---|---|---|---|
| 6,681,049 | B1* | 1/2004 | Kobayashi | G06T 9/005 |
| | | | | 358/3.06 |
| 2003/0138043 | A1* | 7/2003 | Hannuksela | H04N 19/46 |
| | | | | 375/240.08 |
| 2004/0202251 | A1 | 10/2004 | Santosh | |
| 2004/0234144 | A1* | 11/2004 | Sugimoto | H04N 19/176 |
| | | | | 382/239 |
| 2006/0210176 | A1* | 9/2006 | Kajiwara | H04N 19/105 |
| | | | | 382/232 |
| 2007/0121731 | A1* | 5/2007 | Tanizawa | H04N 19/11 |
| | | | | 375/240.24 |
| 2008/0260028 | A1* | 10/2008 | Lamy-Bergot | |
| | | | | H04N 21/23476 |
| | | | | 375/240.13 |
| 2010/0118943 | A1* | 5/2010 | Shiodera | H04N 19/105 |
| | | | | 375/240.12 |
| 2011/0164684 | A1* | 7/2011 | Sato | H04N 19/56 |
| | | | | 375/240.16 |
| 2012/0121018 | A1* | 5/2012 | Kustka | H04N 19/174 |
| | | | | 375/240.16 |
| 2013/0058585 | A1* | 3/2013 | Lim | H04N 19/46 |
| | | | | 382/233 |
| 2013/0128972 | A1* | 5/2013 | Yamaguchi | H04N 19/61 |
| | | | | 375/240.12 |
| 2013/0188885 | A1 | 7/2013 | Matsumura et al. | |
| 2013/0322519 | A1 | 12/2013 | Jiho | |
| 2014/0133550 | A1 | 5/2014 | Pau | |

FOREIGN PATENT DOCUMENTS

| | | |
|---|---|---|
| CN | 102256137 A | 11/2011 |
| CN | 104253993 A | 12/2014 |
| EP | 0750428 A2 | 12/1996 |
| JP | H07321666 A | 12/1995 |
| JP | 2005012495 A | 1/2005 |
| JP | 2006526367 A | 11/2006 |
| JP | 2007097145 A | 4/2007 |
| JP | 2007221201 A | 8/2007 |

OTHER PUBLICATIONS

Takao Omachi, et al., International Standard Algorithm for Color Still Image Data Compression, (JPEG)-Part 1, The Journal of The Institute of Image Electronics Engineers of Japan, 1991, vol. 20.

* cited by examiner

SYSTEM AND METHOD FOR VIDEO PROCESSING

CROSS-REFERENCE TO RELATED APPLICATION

This is a continuation application of International Application No. PCT/CN2015/080230, filed on May 29, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to video imaging and more particularly, but not exclusively, to systems and methods for processing a video.

BACKGROUND

Early video cameras saved uncompressed video directly because no compression mechanism was employed, which requires high bandwidth and big memory space with a hard disk. Particularly, nowadays, four thousand pixel (4K pixel) images are becoming widely popular. It is difficult to directly store uncompressed raw video data acquired from camera sensors because of a requirement of higher imaging rates. For this reason, more and more video cameras employ image compression technologies for compressing images before saving into the hard disk.

Based on levels (or layers) of compression, image compression can be categorized into lossy compression and lossless compression. Representative lossy compression methods are Joint Photographic Experts Group ("JPEG") and H.26X, with JPEG having a compression rate between ten to forty times. H.26X has a higher compression rate, which typically can be as high as two hundred times. But the high compression rates are at an expense of losing certain image information, in addition to complex implementations. Therefore, an image quality of an image created via lossy compression is not as good as an image quality of an image created via lossless compression.

Major lossless compression methods include JPEG lossless compression, arithmetic coding, Huffman coding, variable-length+Huffman coding, Lempel-Ziv-Weich ("LZW") coding, etc. As for compression rate, JPEG lossless coding is greater than arithmetic coding, which is greater than Huffman coding, which is greater than variable-length+Huffman coding, which is greater than LZW coding.

JPEG lossless compression combines prediction values within a frame with Huffman coding that needs a frequency table of the frame image. The image is coded with variable-length coding. If the coding is realized with an Application-Specific Integrated Circuit ("ASIC"), a whole frame of image needs to be buffered (or stored), which requires a large storage space within a camera chip. In most cases, it is almost impossible to buffer a whole frame of image within the chip. A storage chip outside of the ASIC chip is needed, creating extra cost and thereby increasing a difficulty for implementation of compression.

In view of the foregoing reasons, there is a need for systems and methods for lossless compressing frames in a video without extra expense of outside storage chip.

SUMMARY

In accordance with a first aspect disclosed herein, there is set forth a method for processing a video, comprising:
  obtaining a prediction table for a received reference frame of the video; and
  coding one or more target frames of the video based on the prediction table.

In an exemplary embodiment of the disclosed methods, obtaining the prediction table comprises obtaining a prediction Huffman table.

In another exemplary embodiment of the disclosed methods, coding the one or more target frames comprises choosing any frame of the video appearing after the reference frame.

In another exemplary embodiment of the disclosed methods, obtaining the prediction Huffman table comprises generating a Huffman table of a difference value of each reference pixel of the reference frame.

In another exemplary embodiment of the disclosed methods, generating the Huffman table comprises determining a prediction value for each of the reference pixels.

Exemplary embodiments of the disclosed methods further comprise determining the prediction value of the reference pixel based on respective pixel values of one or more pixels adjacent to the reference pixel.

In another exemplary embodiment of the disclosed methods, the prediction value of the reference pixel is a constant value when the reference pixel is located in a first row and a first column of the reference frame.

In another exemplary embodiment of the disclosed methods, wherein the constant value is half of a maximum value of a coding value.

In another exemplary embodiment of the disclosed methods, the constant value is five hundred and twelve when the maximum value of the coding value is one thousand and twenty-four.

Exemplary embodiments of the disclosed methods further comprise selecting the pixels adjacent to the reference pixel from a group of pixels consisting of a first pixel preceding the reference pixel in a same row, a second pixel preceding the reference pixel in a same column, a third pixel adjacent to the first and second pixels, and, when the reference pixel is neither in the first row nor in the first column of the frame, any arithmetic combination of the first, second and third pixels.

Exemplary embodiments of the disclosed methods further comprise determining the prediction value of the reference pixel by the first pixel when the reference pixel is a pixel of the first row.

Exemplary embodiments of the disclosed methods further comprise determining the prediction value of the reference pixel by the second pixel when the reference pixel is a pixel of the first column.

Exemplary embodiments of the disclosed methods further comprise determining the difference value based upon a difference of an actual value of the reference pixel and the prediction value of the reference pixel.

In another exemplary embodiment of the disclosed methods, generating the prediction Huffman table comprises generating a frequency table of an absolute value of the difference value.

In another exemplary embodiment of the disclosed methods, generating the frequency table comprises determining statistics of frequencies of the absolute values to form the frequency table.

In another exemplary embodiment of the disclosed methods, generating the prediction Huffman table comprises generating the prediction Huffman table based on the frequency table.

In another exemplary embodiment of the disclosed methods, coding the one or more target frames further comprises determining an absolute difference value for each target pixel of the one or more target frames.

Exemplary embodiments of the disclosed methods further comprise determining the absolute difference value based upon an absolute value of a difference between an actual value of each target pixel and a prediction value of the target pixel.

Exemplary embodiments of the disclosed methods further comprise determining the prediction value of each target pixel for the one or more target frames.

Exemplary embodiments of the disclosed methods further comprise determining the prediction value of the target pixel based on respective pixel values of one or more pixels adjacent to the target pixel.

In another exemplary embodiment of the disclosed methods, the prediction value of the target pixel is a constant value when the target pixel is located in a first row and a first column of one of the one or more target frames.

In another exemplary embodiment of the disclosed methods, the constant value is half of a maximum value of a coding value.

In another exemplary embodiment of the disclosed methods, the constant value is five hundred and twelve, when the maximum value of the coding value is one thousand and twenty-four.

Exemplary embodiments of the disclosed methods further comprise selecting the pixels adjacent to the target pixel from a group of pixels consisting of a first pixel preceding the target pixel in a same row, a second pixel preceding the target pixel in a same column, a third pixel adjacent to the first and second pixels, and, when the target pixel is neither in the first row nor in the first column of the frame, any arithmetic combination of the first, second and third pixels.

Exemplary embodiments of the disclosed methods further comprise determining the prediction value of the target pixel by the first pixel when the target pixel is a pixel of the first row.

Exemplary embodiments of the disclosed methods further comprise comprising determining the prediction value of the target pixel by the second pixel when the target pixel is a pixel of the first column.

In another exemplary embodiment of the disclosed methods, coding the one or more target frames comprises coding the frames based on the prediction Huffman table of the reference frame and the absolute difference values of the one or more target frames to generate variable-length codes.

In another exemplary embodiment of the disclosed methods, coding the one or more target frames comprises transforming the variable-length codes to fixed-length codes.

In another exemplary embodiment of the disclosed methods, transforming the variable-length codes comprises converting the variable-length codes to the fixed-length codes using a first-in-first-out service to generate the fixed-length codes.

In another exemplary embodiment of the disclosed methods, converting the variable-length code comprises inserting a preselected hexadecimal character after every instance of a special character in accordance with a Joint Photographic Experts Group ("JPEG") protocol.

In another exemplary embodiment of the disclosed methods, inserting the preselected hexadecimal character comprises inserting a hexadecimal zero after every instance of hexadecimal two hundred fifty-five.

Exemplary embodiments of the disclosed methods further comprise compensating the frequency table to generate a compensated frequency table.

In another exemplary embodiment of the disclosed methods, compensating the frequency table comprises widening a coding width of the frequency table.

In another exemplary embodiment of the disclosed methods, compensating the frequency table comprises replacing at least one zero-value each with a non-zero value.

In another exemplary embodiment of the disclosed methods, replacing comprises replacing two or more zeros each with a one.

In accordance with another aspect disclosed herein, there is set forth a video processing system configured to perform the video processing process in accordance with any one of previous embodiments of the disclosed methods.

In accordance with another aspect disclosed herein, there is set forth a computer program product comprising instructions for processing a video in accordance with any one of previous embodiments of the disclosed methods.

In accordance with another aspect disclosed herein, there is set forth a imaging device, comprising:

a sensor for acquiring a sequence of image frames of a video; and a processor for obtaining a prediction table for a received reference frame selected from the sequence of image frames and to code one or more target frames of the video based on the prediction table.

In an exemplary embodiment of the disclosed imaging devices, the prediction table is a prediction Huffman table.

In another exemplary embodiment of the disclosed imaging devices, the one or more target frames comprise any frame appearing after the reference frame.

In another exemplary embodiment of the disclosed imaging devices, the prediction Huffman table is a Huffman table of a difference value for each reference pixel of the reference frame.

In another exemplary embodiment of the disclosed imaging devices, the Huffman table is generated based upon a prediction value of each of the reference pixels.

In another exemplary embodiment of the disclosed imaging devices, the prediction value of the reference pixel is determined based on respective pixel values of one or more pixels adjacent to the reference pixel.

In another exemplary embodiment of the disclosed imaging devices, the prediction value of the reference pixel is a constant value when the reference pixel is located at a first row and a first column of the reference frame.

In another exemplary embodiment of the disclosed imaging devices, the constant value is half of a maximum value of a coding value.

In another exemplary embodiment of the disclosed imaging devices, the constant value is five hundred and twelve when the maximum value of the coding value is one thousand and twenty-four.

In another exemplary embodiment of the disclosed imaging devices, the pixels adjacent to the reference pixel are selected from a group of pixels consisting of a first pixel preceding the reference pixel in a same row, a second pixel preceding the reference pixel in a same column, a third pixel adjacent to the first and second pixels, and, when the reference pixel is neither in the first row nor in the first column of the frame, any arithmetic combination of the first, second and third pixels.

In another exemplary embodiment of the disclosed imaging devices, the prediction value of the reference pixel is determined by the first pixel when the reference pixel is a pixel of the first row.

In another exemplary embodiment of the disclosed imaging devices, the prediction value of the reference pixel is determined the second pixel when the reference pixel is a pixel of the first column.

In another exemplary embodiment of the disclosed imaging devices, the difference value is determined based upon a difference of an actual value of the reference pixel and the prediction value of the reference pixel.

In another exemplary embodiment of the disclosed imaging devices, the prediction Huffman table is generated with a frequency table of an absolute value of the difference value.

In another exemplary embodiment of the disclosed imaging devices, the frequency table is determined upon statistics of frequencies of the absolute values to form the frequency table.

In another exemplary embodiment of the disclosed imaging devices, the prediction Huffman table is generated based on the frequency table.

In another exemplary embodiment of the disclosed imaging devices, the processor is configured to determine an absolute difference value for each target pixel of the one or more target frames.

In another exemplary embodiment of the disclosed imaging devices, the processor is configured to determine the absolute difference value based upon an absolute value of a difference between an actual value of each target pixel and a prediction value of the target pixel.

In another exemplary embodiment of the disclosed imaging devices, the processor is configured to determine the prediction value of each target pixel for the one or more target frames.

In another exemplary embodiment of the disclosed imaging devices, the prediction value of the target pixel is determined based on respective pixel values of one or more pixels adjacent to the target pixel.

In another exemplary embodiment of the disclosed imaging devices, the prediction value of the target pixel is a constant value when the target pixel is located in a first row and a first column of one of the one or more target frames.

In another exemplary embodiment of the disclosed imaging devices, the constant value is half of a maximum value of a coding value.

In another exemplary embodiment of the disclosed imaging devices, the constant value is five hundred and twelve when the maximum value of the coding value is one thousand and twenty-four.

In another exemplary embodiment of the disclosed imaging devices, the pixels adjacent to the target pixel is selected from a group of pixels consisting of a first pixel preceding the target pixel in a same row, a second pixel preceding the target pixel in a same column, a third pixel adjacent to the first and second pixels, and, when the target pixel is neither in the first row nor in the first column of the frame, any arithmetic combination of the first, second and third pixels.

In another exemplary embodiment of the disclosed imaging devices, the processor is configured to determine the prediction value of the target pixel by the first pixel when the target pixel is a pixel of the first row.

In another exemplary embodiment of the disclosed imaging devices, the processor is configured to determine the prediction value of the target pixel by the second pixel when the target pixel is a pixel of the first column.

In another exemplary embodiment of the disclosed imaging devices, the one or more target frames are coded based on the prediction Huffman table of the reference frame and the absolute difference values of the one or more target frames to generate variable-length codes.

In another exemplary embodiment of the disclosed imaging devices, the processor is configured to transform the variable-length codes to fixed-length codes.

In another exemplary embodiment of the disclosed imaging devices, the variable-length codes are transformed from the variable-length codes to the fixed-length codes using a first-in-first-out service.

In another exemplary embodiment of the disclosed imaging devices, the processor further configured to insert a preselected hexadecimal character after every instance of a special character in accordance with a Joint Photographic Experts Group ("JPEG") protocol.

In another exemplary embodiment of the disclosed imaging devices, the special character is a hexadecimal two hundred fifty-five.

In another exemplary embodiment of the disclosed imaging devices, the processor is configured to compensate the frequency table to generate a compensated frequency table.

In another exemplary embodiment of the disclosed imaging devices, the compensated frequency table is compensated by widening a coding width of the frequency table.

In another exemplary embodiment of the disclosed imaging devices, the coding width is widened by replacing at least one zero-value each with a non-zero value.

In another exemplary embodiment of the disclosed imaging devices, the non-zero value is a one.

Exemplary embodiments of the disclosed imaging devices further comprise a memory for storing the one or more frames of the video after coding.

In another exemplary embodiment of the disclosed imaging devices, the memory is configured to store the prediction table of the received reference frame.

Figure 1:
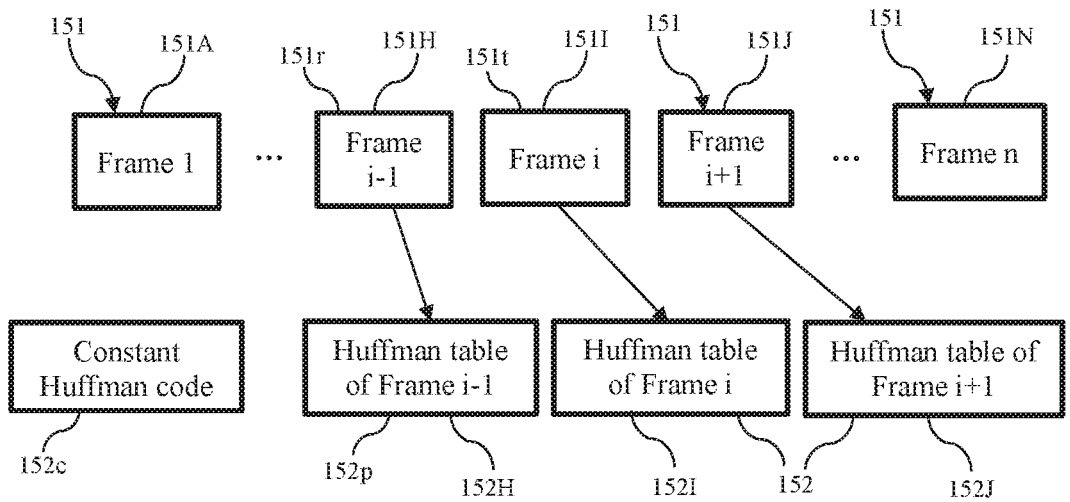
FIG. 1 is an exemplary top level block diagram illustrating a video that comprises a frame sequence of image frames, wherein Huffman tables are associated with certain frames of the video and are used for compressing target frames of the video.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available systems for compression of a video are complicated, require large memory spaces, may result in damages and have limited application in video imaging, a lossless compression system and method that uses a prediction table, such as a Huffman table, based on a reference frame for coding a target frame can prove desirable and provide a basis for a simpler efficient system. This result can be achieved according to one embodiment disclosed in FIG. 1.

FIG. 1 shows a video 150 consisting of a frame sequence of N frames 151. The video 150 is compressible. As shown in FIG. 1, prediction Huffman tables 152 can be associated with certain frames 151 of the video 150 for compressing one or more target frames 151t of the video 150. The target frames 151t can be frames 151 of the video 150 that follow a reference frame 151r in the frame sequence, and the Huffman tables 152p can be created based upon the reference frame 151r. FIG. 1 shows that a target frame 151t, such as an ith frame 151I, can be coded based on a prediction Huffman table 152p of an (i−1)th frame 151H to form a target frame 151t. Similarly, an (i+1)th frame 151J can be coded based on a Huffman table 152I of the ith frame 151I. There can be one exception for a first frame 151A, that has no preceding frame 151. FIG. 1 shows that a constant prediction Huffman code 152c can be used in coding the first frame 151A. The constant Huffman code 152c can be any value within a range of Huffman codes that can be deducted from any of Huffman tables 152.

Although shown and described as using a Huffman table 152p of the reference frame 151r for coding a single target frame 151t immediately following the reference frame 151r for purposed of illustration only, two or more target frames 151t in the frame sequence after the reference frame 151r can be coded based on the prediction Huffman table 152p. In addition, although shown and described as using Huffman tables 152 for predicting the target frames 152t for purposes of illustration only, other suitable forms of prediction tables can also be used in the present disclosure.

Figure 2:
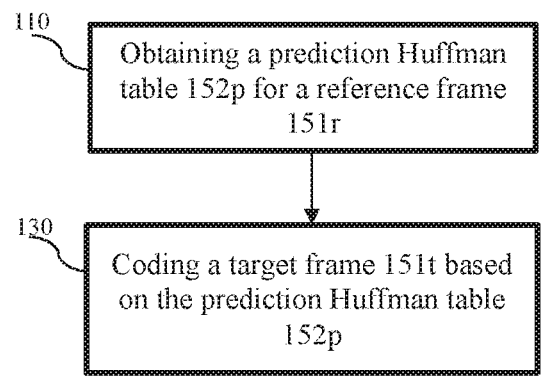
FIG. 2 is an exemplary top level flowchart illustrating an embodiment of a method for compressing the video of FIG. 1, wherein the method includes generating a prediction Huffman table for coding the target frames based on a reference frame of the video.

FIG. 2 illustrates an exemplary embodiment of a method 100 for compressing a video and is described with reference to the video 150 of FIG. 1 for purposes of illustration only. The method 100 can compress the video 150 by using the prediction table 152p of the reference frame 151r, such as the frame 151H of the video 150 for coding a target frame 151t, such as the frame 151I (collectively shown in FIG. 1). The target frame 151t is shown in FIG. 1 as being adjacent to the reference frame 151r. As shown in FIG. 2, a Huffman table 152p for the reference frame 151r can be obtained, at 110, for coding a target frame 151t. The Huffman tables 152p for each frame 151, except a last frame 151N, can be used for coding one or more target frames 151t that appear in the frame sequence after the reference frame 151r, such as the (i−1)th frame 151H. Additional detail of constructing the Huffman table 152p for the reference frame 151r will be shown and described below with reference to FIG. 6

At 130, the target frame 151t can be coded based on the prediction Huffman table 152p, i.e., the Huffman table 152p generated for the reference frame 151r, such as the (i−1)th frame 151H, can be used to code for the ith frame 151I of the video 150. Additional detail of coding for target frames 151t will be shown and described in more detail below with reference to FIG. 10. As described above with reference to FIG. 1, any of the frames 151 that appear in the frame sequence after the reference frame 151r can be coded based on the Huffman table 152p. In one embodiment, a compressing speed of the frames 151 can be slower than an imaging speed of the video 150. The frames 151 after the reference frame 151r, according to this embodiment, can be skipped to help ensure the compressing speed, and the Huffman table 152p can be used to code a target frame 151t that does not immediately follow the reference frame 151r.

Although shown and described as coding one target frame 151t based on the prediction Huffman table 152p for illustrative purposes only, more than one frame 151 can be chosen to be coded based on the Huffman table 152p of the reference frame 151r.

In an exemplary embodiment, an already-received video frame 151 can serve as a reference frame 151r for providing prediction values that can be used to construct the prediction Huffman table 152p. The prediction Huffman table 152p can be used for coding one or more target frames 151t appearing after the reference frame 151r. Such dynamic table generation can release a requirement for buffering video frames 151. In addition, the method 100 can lower an implementation difficulty and/or costs, while efficiently ensuring a coding compression ratio.

Advantageously, the method 100 does not require storage of a whole frame of raw image data for the compression. Instead, only a prediction Huffman table 152p is stored at any time for compressing the target frames 151t. Therefore, memory space requirement of a camera (not shown) for purposes of video compression can be greatly lowered, making compression feasible to be implemented with the camera. In addition, the method 100 can use the prediction Huffman table 152p to implement a lossless compression of the target frames 151t. Therefore, a predetermined quality level for the compression can be ensured.

Although shown and described as using the (i−1)th frame 151H as the reference frame 151r for purposes of illustration only, any other frames 151, except the last frame 151N, can be used as the reference frame 151r.

Figure 3:
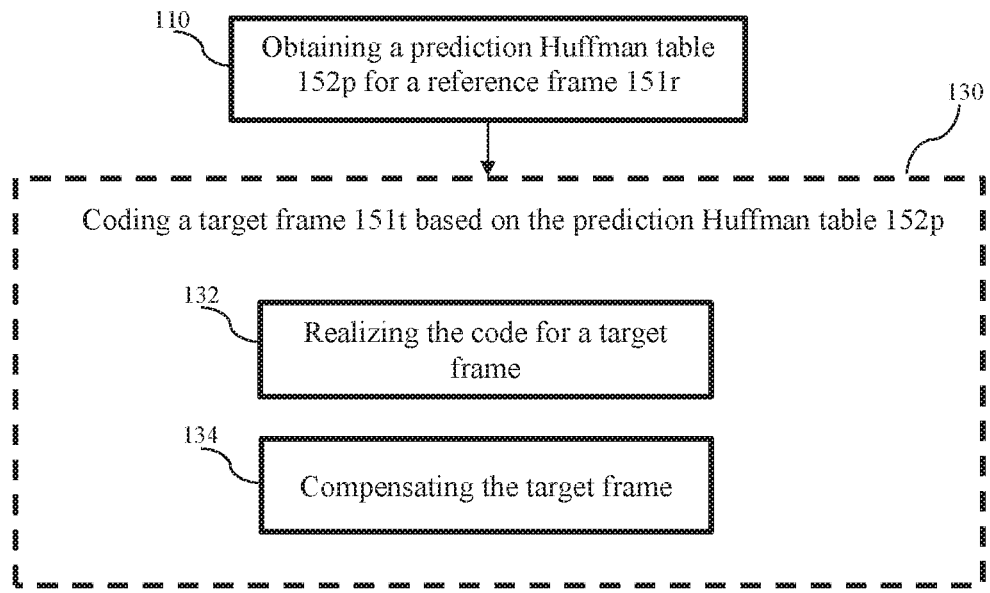
FIG. 3 is an exemplary flowchart illustrating an alternative embodiment of the method of FIG. 2, wherein the method includes additional detail for coding the target frames.

FIG. 3 illustrates an alternative embodiment of the method 100. In FIG. 3, the coding of the target frame 151t, at 130, is shown with additional detail. After obtaining a prediction Huffman table 152p for a reference frame 151r, such as the ith frame 151I (shown in FIG. 1), at 110, a target frame 151t, such as the (i+1)th frame 151J, can be coded at 130 based on the prediction Huffman table 152p.

The prediction Huffman table 152p can be used to a generate Huffman code for each pixel of the target frame 151t. In an exemplary embodiment, the Huffman code is not used alone for coding the target frame 151t. Instead, the Huffman code can be combined with certain information of the target frame 151t, such as absolute difference values for target pixels of the target frame 151t. In some embodiments, in order to code for the target frame 151t based on the Huffman table 152p, a realization process for coding the target frame 151t can be performed, at 132. The codes for the target frame 151t can be constructed based on the prediction Huffman table 152, or the Huffman codes, and the absolute difference values of the target frame 151t. Additional detail regarding the code realization process will be shown and described in greater detail below with reference to FIG. 10.

In real world, scenarios in a video 150 (shown in FIG. 1) can change either slowly and/or abruptly. For purposes of addressing an issue of abrupt scenario changes in the video 150, a frequency table 531 (shown in FIG. 6) can be compensated to enhance an accuracy of the prediction values. The frequency table can be used to create the prediction Huffman table 152p. Additional detail regarding compensating the target frame 151t will be shown and described below with reference to FIG. 7.

Figure 4:
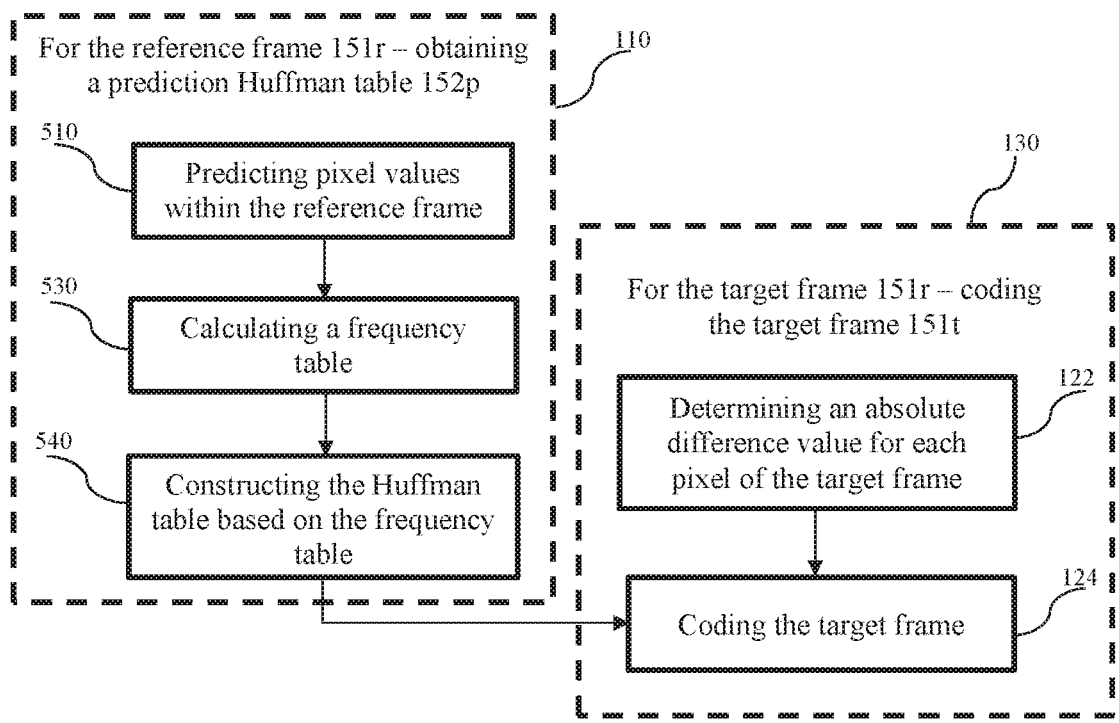
FIG. 4 is an exemplary flowchart illustrating another alternative embodiment of the method of FIG. 2, wherein the method includes operations being performed on both the reference frame and the target frame.

FIG. 4 shows an alternative embodiment of the method 100. Turning to FIG. 4, obtaining of a prediction Huffman table 152p based on a reference frame 151r can be conducted, at 110, in the manner discussed above with reference to the method 100 of FIG. 2. In order to generate the prediction Huffman table 152p, prediction values can be determined, at 510, for each pixel of the reference frame 151r. At 530, a frequency table can be generated based on the prediction values for each pixel of the reference frame 151r. At 540, the prediction Huffman table 152p can be constructed based on the frequency table. Additional detail regarding determining the prediction values, at 510, generating the frequency table, at 530, and constructing the prediction Huffman table 152p, at 540, is shown and described in additional detail below with reference to FIG. 6.

For the target frame 151t, coding of the frame 151t can be conducted, at 130, in the manner discussed above with reference to the method 100 of FIG. 2. To code the target frame 151t, absolute difference values for each pixel, i.e. each target pixel, of the target frame 151t can be determined, at 122, as illustrated in FIG. 4. The absolute difference values can be absolute differences for each and every pixels of the target frame 151t. Each of the absolute difference values can be an absolute value of a difference between an actual value of each pixel and a respective prediction value of the pixel. Additional detail regarding how to determine the absolute difference values of the target frame 151t will be shown and described below with reference to FIG. 10. The absolute difference values for the target frame 151t and the prediction Huffman table 152p can be combined to code the target frame 151t, at 124. Addition detail regarding coding the target frames 151t, at 130, based on the combination of the prediction Huffman table 152p and the absolute difference values of the target frame 151 will be shown and described in greater detail below with reference to FIG. 10.

Figure 5:
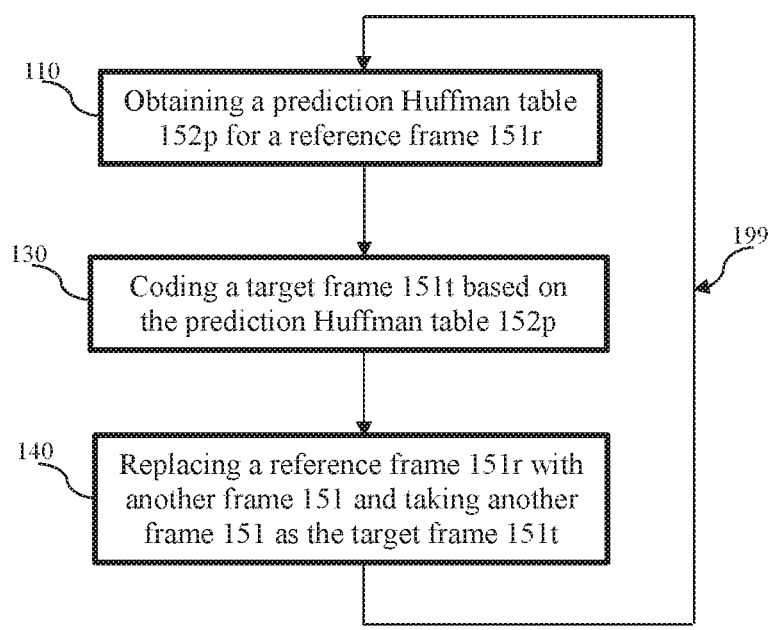
FIG. 5 is an exemplary flowchart illustrating still another alternative embodiment of the method of FIG. 2, wherein the method further comprises a loop for coding multiple frames.

FIG. 5 shows another alternative embodiment of the method 100, wherein the method 100 further comprises a loop 199 for coding multiple frames 151. When one target frame 151t is coded in the manner shown in FIG. 2, the target frame 151t and/or the reference frame 151r can be replaced with other frames 151, at 140. For example, in certain cases, the reference frame 151r can remain as a new reference frame 151r for a new target frame 151t. In other cases, the reference frame 151r can be replaced with another frame 151 following the reference frame 151r. In some embodiments, the new reference frame 151r can be replaced by the target frame 151t that has just compressed for efficiency purposes because absolute difference values of the target frame 151t have already been completed.

At 140, the target frame 151t can be replaced with another frame 151, which can become a new target frame 151t. The new target frame 151t can be any frame 151 appearing after the new reference frame 151r. This process repeats till all target frames 151t of the video 150 are coded.

Although shown and described with reference to FIG. 5 as being repeated by frames 151 immediately following the reference frame 151r and the target frame 151t as newly a selected reference frame 151r and newly selected target frame 151t for purposes of illustration only, any other frames 151 within the video can be selected as the reference frame 151r and/or the target frames 151t.

Figure 6:
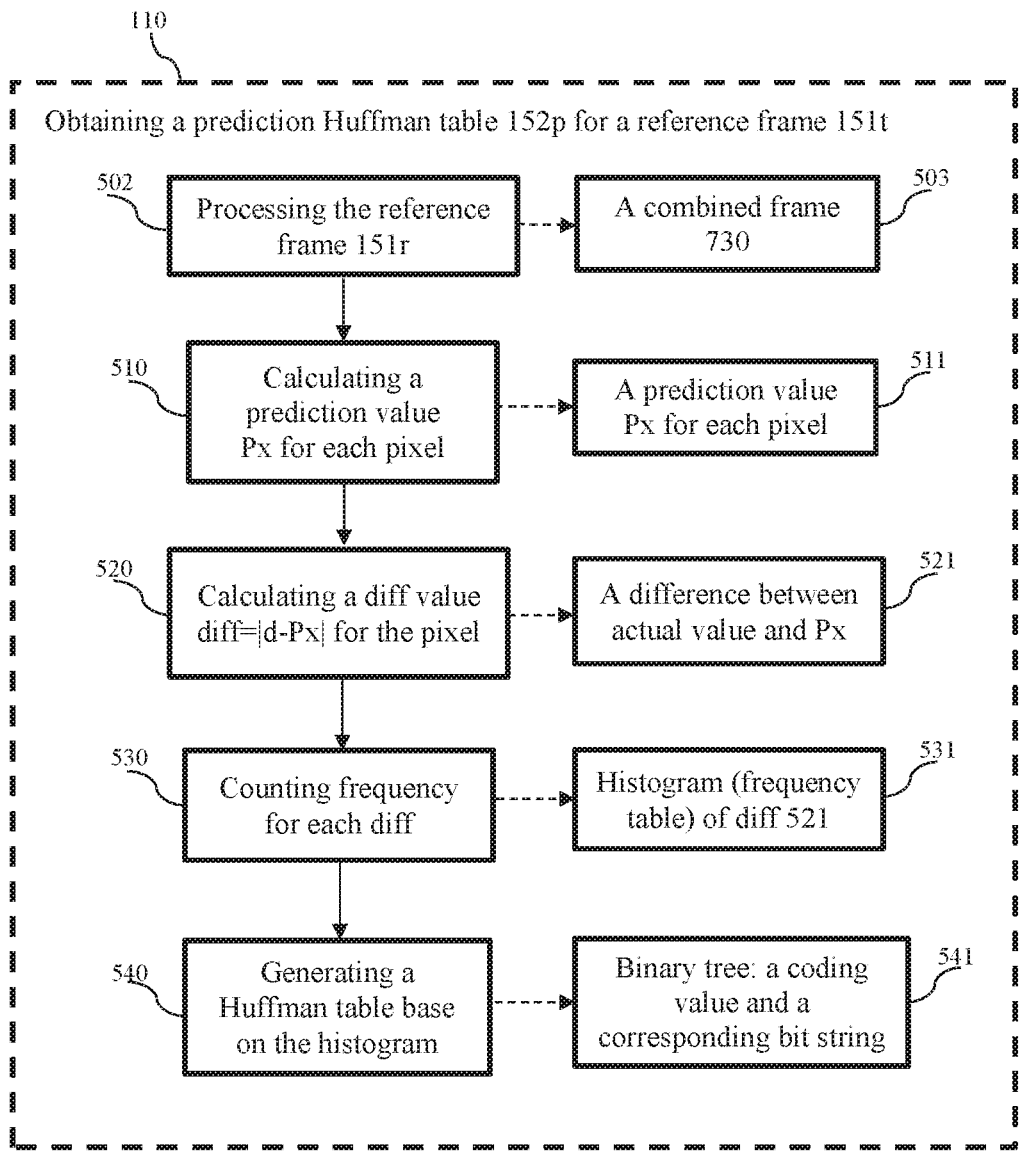
FIG. 6 is an exemplary flowchart illustrating an alternative embodiment of the method of FIG. 3, wherein the method obtains the prediction Huffman table based on the reference frame.
Figure 7:
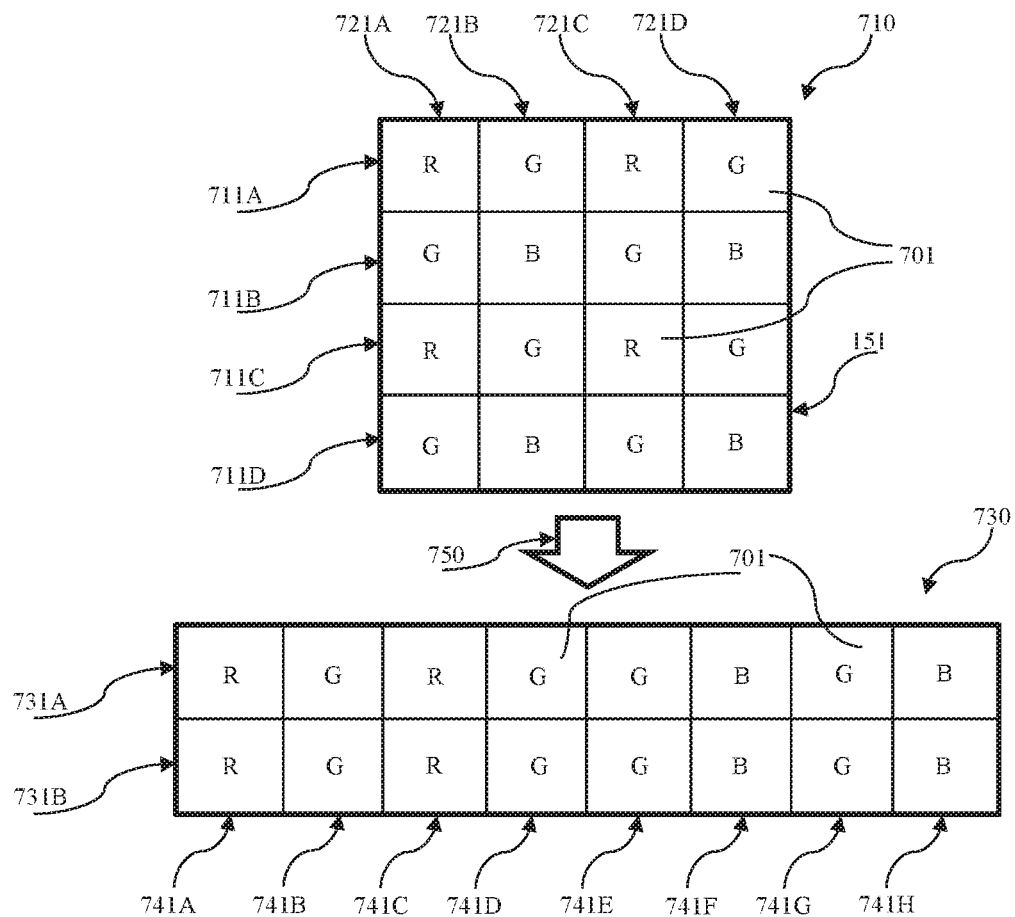
FIG. 7 is an exemplary detail diagram illustrating an embodiment a partial frame of the reference frame of FIG. 6, wherein a partial frame is transformed for obtaining better prediction values for a target frame.

Turning to FIGS. 6 and 7, FIG. 6 shows an embodiment of obtaining a prediction Huffman table 152p based on a reference frame 151r, as part of the method 100. In FIG. 6, at 502, the reference frame 151r can be processed for purposes of better coding and/or better compression. A purpose for processing the reference frame 151r is shown FIG. 7. In FIG. 7, an exemplary typical pixel composition of the reference frame 151r is shown with a partial frame 710 that can be transformed for obtaining better prediction values for target frame 151t. FIG. 7 shows the partial frame 710 has sixteen pixels 701 in four rows 711A, 711B, 711C, 711D and four columns 721A, 721B, 721C, 721D. In the typical pixel composition of the partial frame 710, a pixel with a blue ("B") color component can be located in the second row 711B and the second column 721B. According to an exemplary embodiment shown and described below with reference to FIG. 8, the B color pixel can be predicted by a preceding pixel value red("G") in the same row 711B, a preceding pixel value green("G") in the same column 721B, and a pixel value red ("R") in a preceding row 721A and preceding column 711A. The red-red-green ("GGR") components can be of little relevance with the B color pixel.

In order to address the relevance issue described above, in FIG. 7, a combination process can be provided, at 750, to transform the partial frame 710 into a new partial frame 730. With the combination process, every two rows of pixels are combined into a single row. For example, the rows 711A, 711B can be combined into a new row 731A, and/or the rows 711C, 711D can be combined into a new row 731B. The new partial frame 730 can have eight columns 741A to 741H, each having two pixels. As shown in FIG. 7, the pixels 701 can be rearranged such that the relevance for the prediction pixels 701 can be enhanced by regrouping pixels 701 with likely relevant color components together. For example, the pixel 701 located in the second row 731B and second column 741B is a G color in the transformed partial frame 730. The available prediction pixels preceding the G color pixel are RRG that are more relevant than those preceding pixels 701, which are GGR, in the partial frame 710.

Although shown and described as being combining every two rows of the frame 710 for purposes of illustration only, other suitable combinations can also be provided for purposes of enhancing the accuracy of the predictions, including but not limited to combining two or more columns and/or combining every three or more rows to form the new frame 730.

Figure 8:
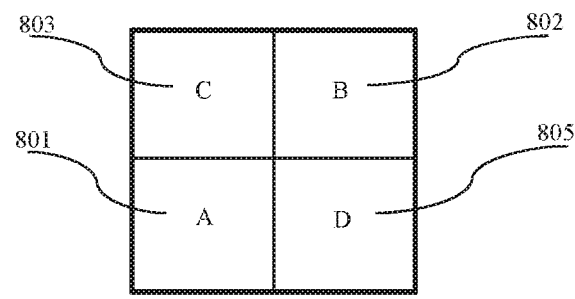
FIG. 8 is an exemplary detail diagram illustrating an alternative embodiment of the reference frame of FIG. 6, wherein a selected pixel is predicted by preceding pixel values.
Figure 9:
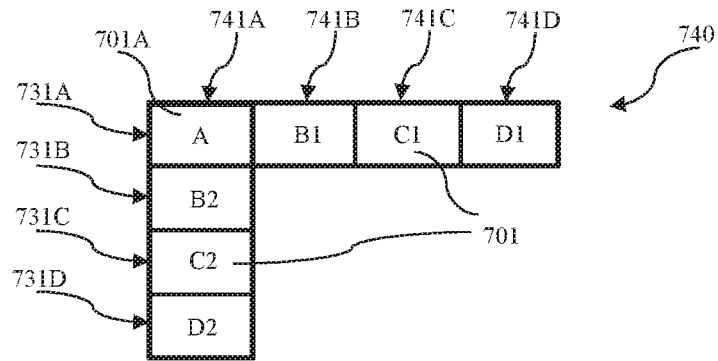
FIG. 9 is an exemplary detail diagram, illustrating another alternative embodiment of the reference frame of FIG. 6, wherein a selected pixel located in a first row or first column is predicted.

Turning to FIGS. 6, 8 and 9, in order to generate a prediction Huffman table 152p for the reference frame 151r, such as the (i−1)th frame (shown in FIG. 1), at 110, each and every pixel 701 of the reference frame 151r can be determined with a prediction value Px (shown in Equations 1-5). For purposes of illustrating this disclosure, each pixel 701 of the reference frame 151r can be referred as a selected pixel 701, which can also be referred as a reference pixel for the reference frame 151r. In some exemplary embodiments, part or all pixels 701 of the reference frame 151r can be selected as selected pixels, or reference pixels, for calculating the prediction values Px. At 510, for one selected pixel 701, such as pixel D 805 (as shown in FIG. 8), a prediction value Px can be calculated according to at least one of the preceding pixels adjacent to the selected pixel 701. For purposes of illustrating the present disclosure, three pixels preceding the selected pixel 701 can be referred as a first pixel, a second pixel and a third pixel. In FIG. 8, the preceding adjacent pixels can include the first pixel preceding the selected pixel in a same row with the selected pixel, such as pixel A 801 for pixel D, the second pixel preceding the selected pixel in a same column with the selected pixel 701, such as pixel B 802 for pixel D 805. In addition, the adjacent pixels to the selected pixel 701 can also include the third pixel in the same row with the first pixel and same column with the second pixel, such as pixel C 803 for pixel D 805.

When the selected value is not in a first row or in a first column of the frame 151r, the prediction value of the selected pixel 701, such as the pixel D 805, can be determined with any one of the actual pixel values pixel A, pixel B or pixel C. In the same case, the prediction value of the selected pixel 701 can also be determined via one of the following equations:

$P_x = a+b-c$      Equation (1)

$P_x = a+(b-c)*½$      Equation (2)

$p_w = a+(c-b)*½$      Equation (3)

$P_x = b+(a-c)*½$      Equation (4)

$P_x = (a+b)*½$      Equation (5)

wherein, $P_x$ denotes the prediction value of the selected pixel 701, "a" denotes an actual value of the first pixel, pixel A, preceding the selected pixel, "b" denotes an actual value of the second pixel, pixel B, preceding the selected pixel, and "c" denotes an actual value of the third pixel, pixel C, preceding the selected pixel.

In special cases, such as the exemplary special case shown in FIG. 9, for pixels 701 located in a first row 731A and/or in a first column 741A, the pixels 701 can be predicted by a constant value and/or by an actual value of one or more pixels 701 available in a preceding row or column. In FIG. 9, in an exemplary embodiment, pixel A 701A can be a first pixel of a frame 740, which pixel A 701A does not have any preceding pixel 701. Pixel A 701A can have a constant C as its prediction value, such that: $P_A=C$. The constant C can be half of a maximum pixel value, such as five hundred and twelve (512) when the maximum pixel value is one thousand and twenty-four (1024). A prediction value $P_{B1}$ for pixel B1 can be an actual value of pixel A 701A, a prediction value $P_{C1}$ for pixel C1 can be an actual value of pixel B1, and a prediction value $P_{D1}$ for pixel D1 can be an actual value of pixel C1. In a similar manner, for the column 741A, a prediction value $P_{B2}$ for pixel B2 can be the actual value of pixel A 701A, a prediction value $P_{C2}$ for pixel C2 can be the actual value of pixel B2, and a prediction value $P_{D2}$ for pixel D2 can be the actual value of pixel C2.

As an illustrative example, let us assume that pixel A 701A has an actual value of 400 and that pixel B1 has an actual value of 200, and that pixel C1 has an actual value of 300. Then, Pixel A can have a constant prediction value, e.g. five hundred and twelve (512), i.e. $P_A=512$. The prediction value for pixel B1, $P_{B1}$, can be the actual value of Pixel A 701A, which is 400, i.e. $P_{B1}=400$. The prediction value for pixel C1, $P_{C1}$, can be the actual value of Pixel B1, which is 200, i.e. $P_{C1}=200$. In addition, the prediction value for pixel D1, $P_{D1}$, can be the actual value of Pixel C1, which is 300, i.e. $P_{D1}=300$. Values for $P_{B2}$, $P_{C2}$ and $P_{D2}$ can be determined in a similar manner.

In FIG. 6, a result of the calculation, at 510, is a prediction value 511, for each selected pixel 701, that normally can have a difference with the actual value of the selected pixel 701. Although shown and described as using an immediate preceding pixel for predictions of any pixels 701 for purpose of illustration only, any suitable preceding pixels 701 in the partial frame 710 can be used for the predictions.

At 520, a difference value between the prediction value 511 and the actual value of the selected pixel 701 can be calculated. In order to achieve a positive difference value, an absolute value of the difference value can be taken, at 520. Therefore, a result of the calculation, at 520, can be an absolute difference value of the difference value 521 between the actual value of the selected pixel and the prediction value that is the result of 520. Generally, this result can be determined with the following equation:

$$\text{diff}=|d-Px| \qquad \text{Equation (6)}$$

where diff denotes the absolute difference value 521 between the actual value of the selected pixel 701 and the prediction value; d denotes the actual value of the selected pixel 701; and Px denotes the prediction value of the selected pixel 701.

Although shown and described as being a simple difference between the actual value of the selected pixel 701 and the prediction value for purposes of illustration only, any other suitable arithmetic difference values can be provided to reflect the difference under this disclosure.

In exemplary embodiments of the present disclosure, at 530, a frequency table 531 can be constructed in a form of a histogram based on the calculated absolute difference values 521 for each and every pixel 701 of the reference frame 151r. The frequency table 531 can be constructed by counting frequencies for each of the absolute difference values of the pixels 701. In an exemplary embodiment, the counting of the frequencies can be conducted by counting appearances of each difference value. In a typical ten-bit coding system, each difference value can consist of ten bit of ones or zeros. In some embodiments, the counting of frequencies can be conducted by counting the appearance of a highest non-zero value, i.e. a highest one, in each difference value.

The result of counting frequency for each difference value, at 530, can be the frequency table 531 in the form of histogram (not shown). The frequency table 531 can have two sets of information: one set represents a value dataset of the available absolute difference values 521, such as $\{d_1, d_2, \ldots, d_i, \ldots, d_n\}$; and the other set is a frequency dataset represents frequencies corresponding to each of the absolute difference values 521, such as $\{f_1, f_2, \ldots, f_i, \ldots, f_n\}$. In some embodiments, when a ten-bit coding system is used and the highest non-zero value is counted, the value dataset can be $\{d_1, d_2, \ldots, d_i, \ldots, d_{10}\}$ and the frequency dataset can be $\{f_1, f_2, \ldots, f_i, \ldots, f_{10}\}$.

Although shown and described as using ten-bit coding for purposes of illustration only, the method 100 can use extended coding of twelve bit and/or sixteen bit coding systems.

At 540, a prediction Huffman table 152p for the reference frame 151r can be generated, in a form of a binary tree 541, based on the frequency table 531. The binary tree 541 can be created in any ordinary ways of constructing a Huffman table 152p. One way of constructing the Huffman table 152p can include working from bottom up of the binary tree 541, sorting the value dataset by the frequency dataset, making two-lowest elements into leaves, and creating a parent mode with a frequency being a sum of the frequencies of the two lower elements. The Huffman table 152p can carry information of coding values and corresponding bit string for each coding value, which string unambiguously represents the coding value.

The prediction Huffman table 152p, or the binary tree 541, can carry Huffman codes for each of the absolute difference values 521. The Huffman codes are normally variable-length because of differences among the frequencies of each of the absolute difference values 521. The variable-length codes can be further processed with additional detail being shown and described below with reference to FIG. 10.

Figure 10:
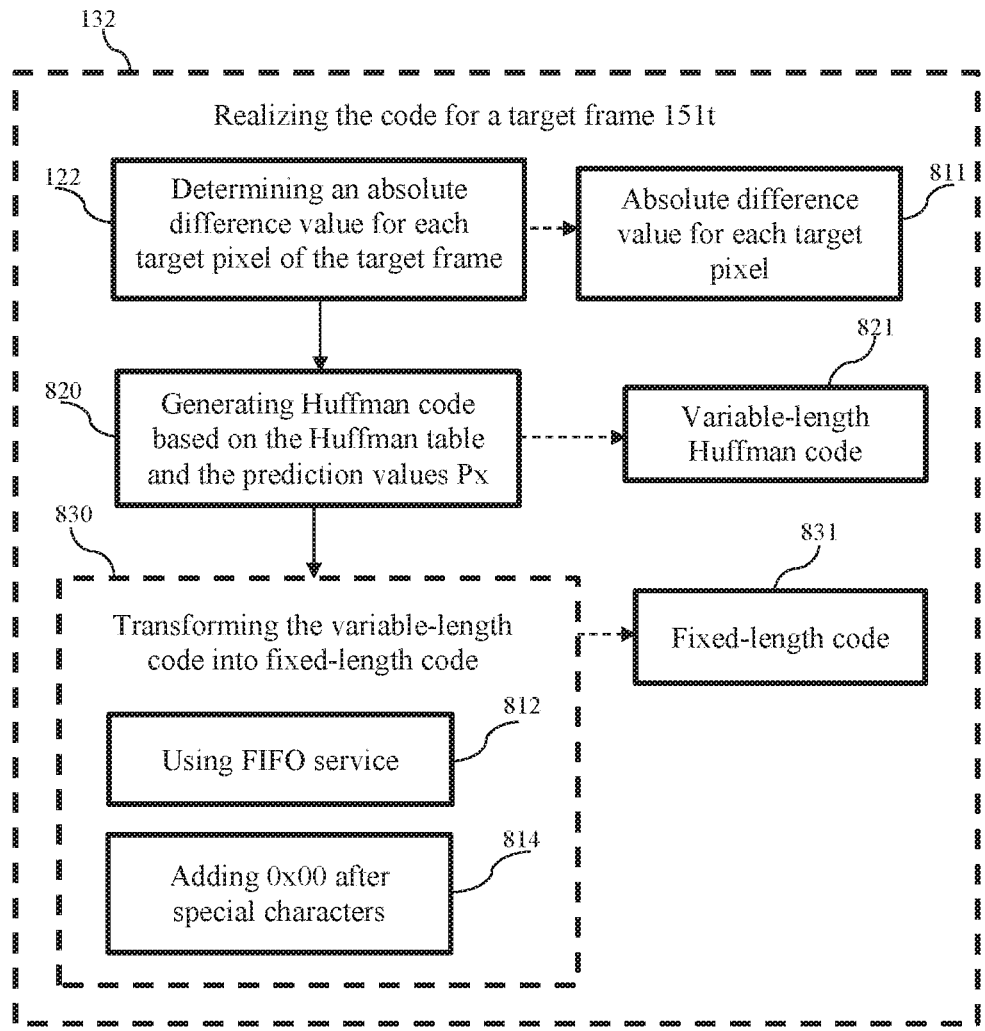
FIG. 10 is an exemplary flowchart illustrating another alternative embodiment of the method of FIG. 3, wherein the method includes coding the target frame based on the prediction Huffman table, which is based on a reference frame and prediction values of the target frame.

FIG. 10 shows an embodiment of coding a target frame 151t based on the prediction Huffman table 152p for the method 100, which prediction Huffman table 152p is based on a reference frame 151r and prediction values of the target frame 151t. At 122, absolute difference values, diff of Equation 6, for each selected pixel 701 of the target frame 151t can be determined. The absolute difference values of the target frame 151t can be determined in a same manner as shown and described above for the absolute difference values for the reference frame 151r, at 510, with reference to FIG. 6 and Equations 1-6. For purposes of this disclosure, each selected pixel 701 of the target frame 151t can be referred as a target pixel for the target frame 151t. As shown and described for the absolute difference values at 521, the result of the calculation at 122 can be absolute difference values 811 for each pixel of the target frame 151t.

At 820, a Huffman code for each pixel of the target frame 151t can be generated based on the prediction Huffman table 152p of the reference frame 151r and the absolute difference values 811. In some embodiments, the Huffman code 821 for a selected pixel 701 of the target frame 151t can be generated by combining the Huffman code 541 represented in the prediction Huffman table 152p for the selected pixel 701 and the absolute difference value 811 obtained from the calculation process, at 122. Generally, the combined Huffman codes have variable-lengths because both of the Huffman codes generated from the prediction Huffman table 541 of the reference frame 151r and the absolute difference values 811 of the selected pixels 701 can vary in length.

Although shown and described with reference to FIG. 10 as using simple combing the Huffman code and the absolute difference value 811 for generating the combined Huffman code for purposes of illustration only, any other suitable combinations of the Huffman code and the absolute difference value 811 can be applied under the present disclosure.

The combined variable-length Huffman codes 821 can be difficult to process. Therefore, a transformation from the variable-length Huffman codes to fixed-length codes can be provided under the present disclosure.

In FIG. 10, at 830, the transformation from the variable-length code 821 to fixed-length code 831 comprises using a first-in-first-out service ("FIFO") 850, at 812, to convert the variable-length codes. At 812, the variable length codes can be streamlined into the FIFO service 850.

Figure 11:
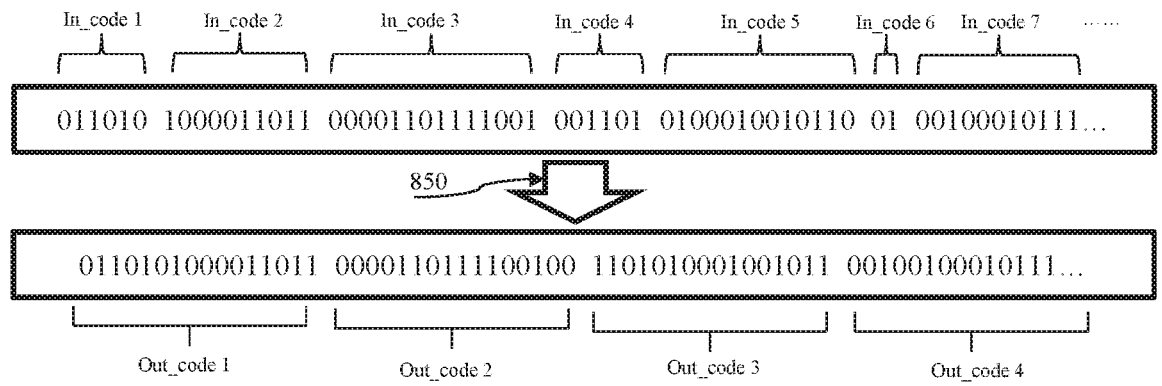
FIG. 11 is an exemplary detail diagram illustrating an embodiment of the manner by which a FIFO service can be used for transforming variable-length codes to fixed-length codes.

An exemplary embodiment of the FIFO service 850 is shown in FIG. 11, which service can be used for transforming variable-length codes to fixed-length codes. In FIG. 11, a series of input codes, in_code 1 to in_code 8 and more, can be input into the FIFO service 850. The input codes, in_code 1 to in_code 8 can represent the variable-length codes 821. In FIG. 11, after the FIFO service 850, the input codes are transformed into output codes, out_code 1 to out_code 4 and more, which are in fixed-length of sixteen bits.

Although shown and described in FIG. 11 as using the FIFO service 850 for transforming the variable-length codes for purposes of illustration only, other forms of services can be applied to transform the variable-length codes, including but not limited to padding zeros before and/or after each code to generate a fixed-length code.

In a course of the transformation process 830, certain bytes of the target frame 151t may coincide with special characters defined under the JPEG protocol. In such case, those bytes can be marked with identification characters, at 814. Such addition of identification characters can comprise a hexadecimal zero, 0x00. The identification character can be added immediately after those bytes, or be added immediately before each appearance of the special bytes. In an exemplary embodiment, a hexadecimal zero, 0x00, can be added after each appearance of hexadecimal two hundred and fifty-five, 0XFF.

Returning to FIG. 10, the output of the transformation 830 can be a fixed-length code 831. Although shown and described with reference to FIG. 10 as using the identification character 0x00 to mark each appearance of special characters for purposes of illustration only, other suitable forms of identification approaches can also be applied under the present disclosure.

Figure 12:
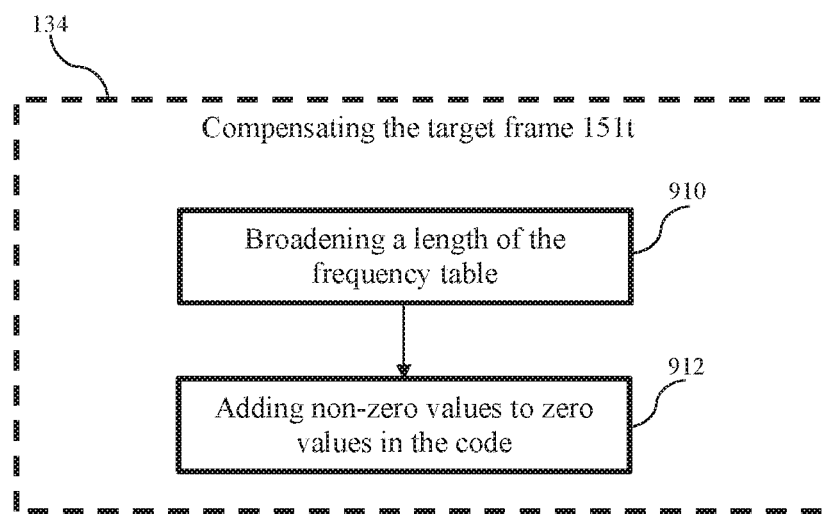
FIG. 12 is an exemplary flowchart illustrating still another embodiment of the method of FIG. 3, wherein the method includes compensating the target frame by broadening a length of the frequency table.

FIG. 12 shows an embodiment of a compensation approach, at 134, for coding a target frame 151t, by broadening a length of a frequency table that is used to generate a prediction Huffman table 152p of a reference frame 151r. In some cases, scenarios being video recorded can change slowly, and relevance between frames 151 can be relatively greater. In such case, prediction values for each target frame 151*t* can be more accurate. However, in some other cases, the scenarios being videoed can change rapidly or abruptly, and the relevance between frames 151 can be relatively less. In such cases, significant differences between a frequency table 531 (shown in FIG. 6) of the reference frame 151*r* and the frequency table 531 of the target frame 151*t* can exist. To address this issue, a length of the frequency table 531 of the reference frame 151*r* can be broadened with extra numbers, at 910.

In one exemplary embodiment, such broadening can be realized by replacing zero values with non-zero values, such as ones in the frequency table 531 of the reference frame 151*r*, at 912. In some embodiments, zeros immediately after the non-zero values can be replaced by non-zeros. In an alternative embodiment, two zeros immediately after the non-zero values can be replaced by non-zeros, e.g. by ones. For example, assume the frequency table 531 is: 15, 15, 15, 15, 15, 15, 15, 0, 0, 0, 0, 0. By replacing the two zeros immediately after the last 15 with ones, a new frequency table can be obtained as: 15, 15, 15, 15, 15, 15, 15, 1, 1, 0, 0, 0.

Figure 13:
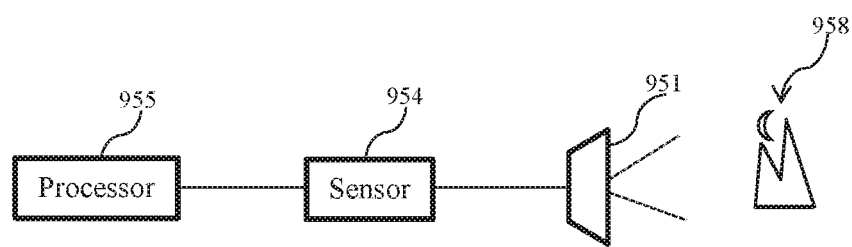
FIG. 13 is an exemplary top-level block diagram illustrating an embodiment of an imaging device for implementing the method of FIG. 2.

FIG. 13 shows an exemplary embodiment of an imaging device 200 for implementing the method of FIG. 2. The imaging device 200 can be a video and/or still camera. The imaging device 200 can comprise a lens 951, an image sensor 954, and/or a processor 955. The lens 951 can receive light from a scene 958. The lens 951 can be configured to focus the received light onto the image sensor 954, which generates images of the scene 958. In case of the video camera, the images generated can be the frames 151 within the video 150 (collectively shown in FIG. 1). The processor 955 can then process the frames for compressing the video in accordance with the method 100 shown and described in more detail above with reference to any one of FIGS. 2-5, 6, 10, and 12.

An exemplary embodiment of the lens 951 can be a digital single-lens reflex ("DSLR") lens; however, the lens 951 can comprise any conventional type of lens. Exemplary suitable lenses as the lens 951 can include one or more of a pin-hole lens, a biological lens, a simple convex glass lens, or the like, without limitation. Additionally and/or alternatively, the lens 951 can be configured with certain imaging properties such as one or more of a macro lens, zoom lens, telephoto lens, fisheye lens, wide-angle lens, or the like, without limitation.

The image sensor 954 can receive the light from the lens 951 and form an image based on the light received. The image sensor 954 can be a charge coupled sensor ("CCD"), complementary metal-oxide-semiconductor ("CMOS") sensor, N-type metal-oxide-semiconductor ("NMOS") sensor, and hybrids/variants thereof, an electro-optical sensor, a thermal/infrared sensor, a color or monochrome sensor, a multi-spectral imaging sensor, a spectrophotometer, a spectrometer, a thermometer, and/or an illuminometer.

The processor 955 can comprise any commercially-available graphic chip that chips can be used in currently available video equipment. The processor 955 can also be a custom-designed graphic chips specially produced for the imaging device 200. The processor 955 can also comprise additional chips for accelerating rendering of 2D graphics and/or 3D scenes, MPEG-2/MPEG-4 decoding, TV output, or an ability to connect multiple displays. In one of the embodiments, the processor 955 can operate under a VGA standard. Additionally and/or alternatively, the processor 955 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The processor 955 can be configured to perform any of the methods described herein, including but not limited to, a variety of operations relating to image/frame processing. In some embodiments, the processor 955 can include specialized hardware for processing specific operations relating to imaging processing.

The processor 955 can usually be operably connected to the image sensor 954. The connection can be via a wired and/or wireless link. The processor 955 can process a non-coded image/frame received by the image sensor 955 and can code the non-coded image/frame image automatically in accordance with the method 200 disclosed herein. The processor 955 can perform any one or more of the processes of method 100 shown and described with reference to any one of FIGS. 2-5, 6, 10, and 12.

Figure 14:
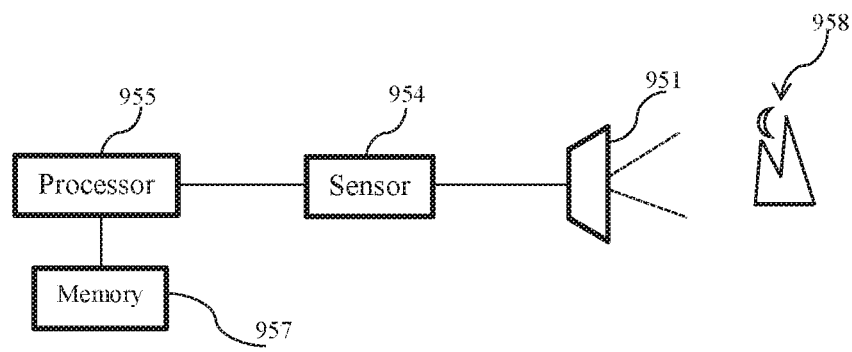
FIG. 14 is an exemplary top-level block diagram, illustrating an alternative embodiment of the imaging device of FIG. 13, wherein the imaging device comprises a memory for storing the video of FIG. 1.

Turning to FIG. 14, an imaging device 200 can also contain a memory 957. The processor 955 of the imaging device 200 can be operatively connected to the memory 957. The memory 957 optionally can be provided for storing non-coded images (or frames) from the image sensor 954 and/or coded/compressed images (or frames) from the processor 955. The memory 957 can be linked to the processor 955 via wired or wireless connections. The memory 957 can also be linked (not shown) to any other components of the imaging device 200, such as the image sensor 954.

Exemplary examples of the memory 957 can be a random access memory ("RAM"), static RAM, dynamic RAM, read-only memory ("ROM"), programmable ROM, erasable programmable ROM, electrically erasable programmable ROM, flash memory, secure digital ("SD") card, and the like. In some embodiments, as described above with reference to FIG. 13, the imaging device 200 can be a video camera. In such a case, the memory 957 can be used to store a compressed video 150 (shown in FIG. 1).

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for processing a video, comprising:
   receiving and storing a reference frame of the video in a memory;
   obtaining a prediction table for the reference frame of the video based on a pixel value of each reference pixel within the reference frame, including obtaining a prediction Huffman table by:
     for each of reference pixels within the reference frame, determining a prediction value based on respective pixel values of one or more adjacent pixels; and
     generating the prediction Huffman table of difference values of the reference pixels, the difference value of one of the reference pixels being based at least on the prediction value of the one of the reference pixels;
   storing the prediction table in the memory and releasing the reference frame from the memory;
   receiving a target frame arranged after the reference frame in a frame sequence of the video; and coding, based on the stored prediction table of the reference frame, the target frame of the video.

2. The method of claim 1, wherein the one or more adjacent pixels adjacent to one of the reference pixels are selected from a group of pixels consisting of a first pixel preceding the one of the reference pixels in a same row, a second pixel preceding the one of the reference pixels in a same column, a third pixel adjacent to the first and second pixels, and any arithmetic combination of the first, second and third pixels.

3. The method of claim 1, wherein:
the difference value of the one of the reference pixels is determined based upon a difference between an actual value of the one of the reference pixels and the prediction value of the one of the reference pixels;
generating the prediction Huffman table comprises:
determining statistics of frequencies of absolute values of the difference values of the reference pixels to form a frequency table of the absolute values; and
generating the prediction Huffman table based on the frequency table.

4. The method of claim 1, wherein:
the reference pixels within the reference frame are in sequence, including a first reference pixel preceding all other reference pixels in the sequence and a second reference pixel succeeding the first reference pixel in the sequence; and
determining the prediction value for each of the reference pixels within the reference frame includes:
determining a constant value as a prediction value of the first reference pixel, the constant value being equal to half of a maximum pixel value of the video; and
determining a prediction value of the second reference pixel based on a pixel value of each of one or more reference pixels preceding the second reference pixel.

5. The method of claim 1, further comprising:
determining an absolute difference value for each target pixel of the target frame based upon an absolute value of a difference between an actual value and a prediction value of the each target pixel;
wherein coding the target frame includes:
coding the target frame based on the prediction Huffman table of the reference frame and the absolute difference values of the target pixels of the target frame to generate variable-length codes.

6. The method of claim 5, wherein coding the target frame further includes transforming the variable-length codes to fixed-length codes using a first-in-first out service.

7. The method of claim 6, wherein transforming the variable-length codes to the fixed-length codes includes:
inserting a hexadecimal zero after every instance of hexadecimal two hundred fifty-five.

8. The method of claim 3, further comprising:
compensating the frequency table to generate a compensated frequency table.

9. The method of claim 8, wherein compensating the frequency table includes widening a coding width of the frequency table.

10. The method of claim 9, wherein compensating the frequency table further includes replacing at least one zero-value each with a non-zero value.

11. An imaging device, comprising:
a sensor configured to acquire a sequence of image frames of a video; and
a processor configured to:
receive a reference frame of the video from the sensor and store the reference frame in a memory;
obtain a prediction table for the reference frame based on a pixel value of each reference pixel within the reference frame, including obtaining a prediction Huffman table by:
for each of reference pixels within the reference frame, determining a prediction value based on respective pixel values of one or more adjacent pixels; and
generating the prediction Huffman table of difference values of the reference pixels, the difference value of one of the reference pixels being based at least on the prediction value of the one of the reference pixels;
store the prediction table in the memory and releasing the reference frame from the memory;
receive, from the sensor, a target frame of the video arranged after the reference frame in the sequence of image frames of the video; and
code, based on the stored prediction table of the reference frame, the target frame of the video.

12. The imaging device of claim 11, wherein the one or more adjacent pixels adjacent to one of the reference pixels are selected from a group of pixels consisting of a first pixel preceding the one of the reference pixels in a same row, a second pixel preceding the one of the reference pixels in a same column, a third pixel adjacent to the first and second pixels, and any arithmetic combination of the first, second and third pixels.

13. The imaging device of claim 11, wherein the difference value of the one of the reference pixels is determined based upon a difference between an actual value of the one of the reference pixels and the prediction value of the one of the reference pixels.

14. The imaging device of claim 13, wherein the prediction Huffman table is generated with a frequency table of the absolute values of the difference values for the reference pixels.

15. The imaging device of claim 14, wherein the frequency table is determined upon statistics of frequencies of the absolute values.

* * * * *